(12) United States Patent
DeMars et al.

(10) Patent No.: US 6,290,185 B1
(45) Date of Patent: Sep. 18, 2001

(54) SOLAR THERMAL ROCKET

(75) Inventors: Richard Vail DeMars; Barry John Miles, both of Lynchburg; Barry Gene Miller, Goode; Kurt Ogg Westerman, Forest, all of VA (US)

(73) Assignee: BWX Technologies, Inc., Lynchburg, VA (US)

( * ) Notice: Subject to any disclaimer, the term of this patent is extended or adjusted under 35 U.S.C. 154(b) by 0 days.

(21) Appl. No.: 09/427,844

(22) Filed: Oct. 26, 1999

(51) Int. Cl.$^7$ ....................................................... B64G 1/40
(52) U.S. Cl. ...................... 244/172; 60/203.1; 60/641.8; 244/173
(58) Field of Search ................................. 244/63, 158 R, 244/172, 173, 62; 60/203.1, 229, 228, 641.8, 641.11, 641.12, 641.13, 641.14, 641.15, 200.1

(56) References Cited

U.S. PATENT DOCUMENTS

| | | | |
|---|---|---|---|
| 3,097,480 | * | 7/1963 | Sohn . |
| 3,825,211 | * | 7/1974 | Minovitch . |
| 4,354,348 | * | 10/1982 | Lee . |
| 4,452,047 | * | 6/1984 | Hunt et al. . |
| 4,528,978 | * | 7/1985 | Robinson . |
| 4,781,018 | * | 11/1988 | Shoji . |
| 4,945,731 | * | 8/1990 | Parker et al. . |
| 5,685,505 | * | 11/1997 | Meckler . |
| 6,065,284 | * | 5/2000 | Horner et al. . |

FOREIGN PATENT DOCUMENTS

2125157 * 2/1984 (GB) ................................. 244/172

* cited by examiner

*Primary Examiner*—Charles T. Jordan
*Assistant Examiner*—Tien Dinh
(74) *Attorney, Agent, or Firm*—Robert J. Edwards; D. Neil LaHaye

(57) ABSTRACT

A solar thermal rocket that includes a thermal energy storage section, a radiant inter-heater, a primary solar concentrator, and a propulsion nozzle. The primary solar concentrator is selectively movable to direct solar energy to either the thermal energy storage section or to the radiant inter-heater. The thermal energy storage section, along with insulation, is arranged to define a cavity such that a focused beam of solar rays can enter the cavity through an aperture in the insulation. The thermal energy storage section typically absorbs and stores solar energy during the non-propulsion portion of the orbital period. The solar rays are captured and absorbed and thereby heat the thermal energy storage section to very high temperatures. A radiant inter-heater directly receives concentrated solar rays and transfers the heat to the propellant during the propulsion phase. The propellant heated by the inter-heater is directed through the thermal energy storage section where it is further heated to its peak temperature and then expelled through the nozzle to produce thrust. With the inter-heater, the rate of heat extraction from the thermal energy storage section is reduced, prolonging the period of peak propellant temperature, resulting in an overall higher average specific impulse.

2 Claims, 2 Drawing Sheets

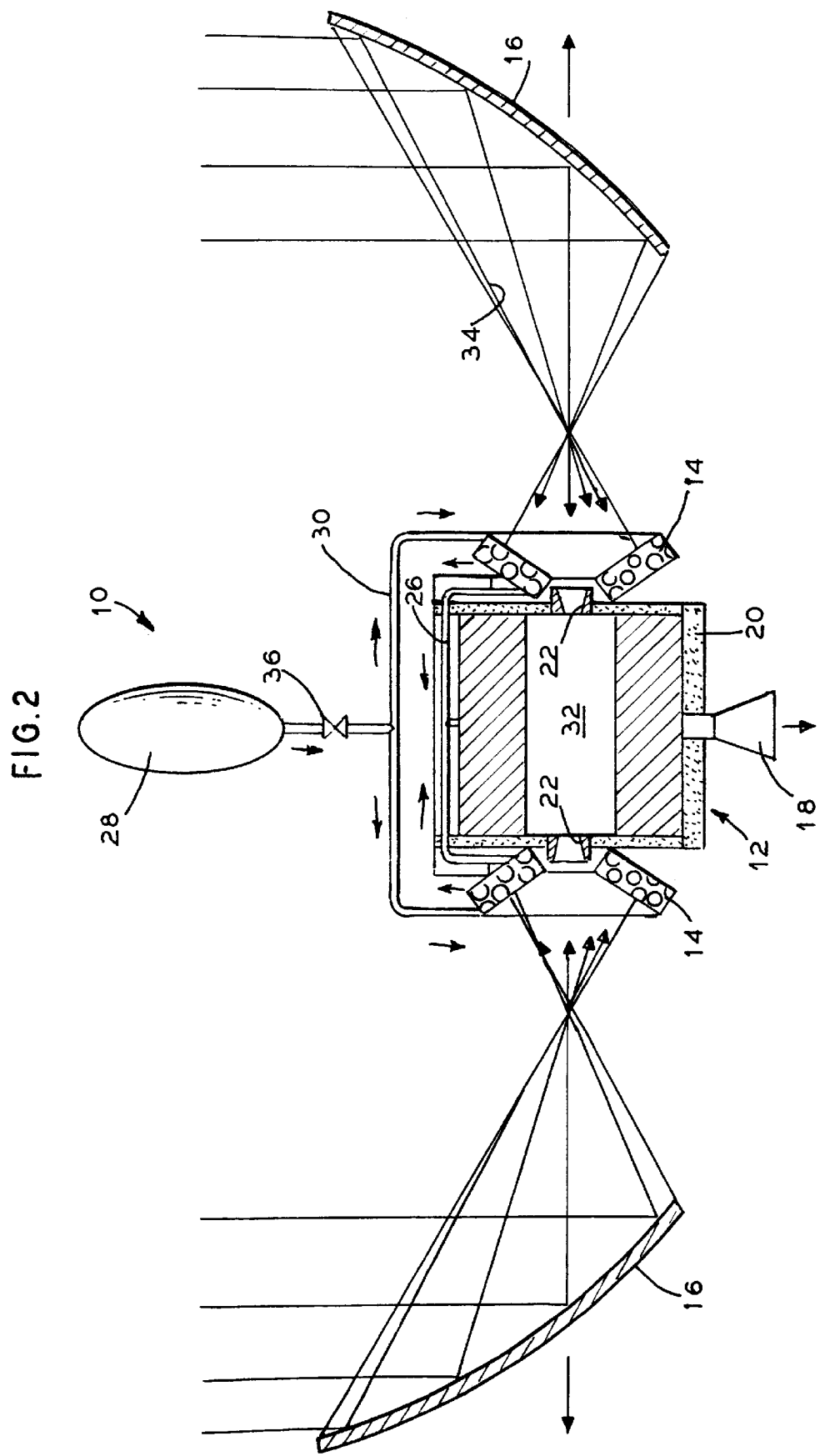

SOLAR THERMAL ROCKET

BACKGROUND OF THE INVENTION

1. Field of the Invention

The invention is generally related to rockets and more particularly to solar thermal rockets.

2. General Background

Solar thermal rockets were first proposed in 1954 as a way to provide greater specific impulse than chemical rockets. Solar thermal rockets use the sun's energy to heat a propellant (typically hydrogen) to extremely high temperatures and then expel the hot gas through a nozzle to provide thrust. The high temperature and low molecular weight of the propellant combine to produce a specific impulse of two to four times that of a chemical rocket. Generally, solar thermal rockets have been of either a "direct gain" design in which the propellant is heated directly by very large solar collectors during a long continuous burn, or of a "thermal energy storage" design which collects and stores energy from smaller collectors for use in short impulsive "burns". Recently, a "Hybrid Direct Gain/Thermal Energy Storage" design has been proposed that combines the high-temperature propellant capability of the direct gain design with the smaller collector feature of the thermal energy storage design. Each of these designs has advantages and disadvantages.

The direct gain rocket requires very large solar collectors (concentrators) to provide sufficient energy to heat the hydrogen propellant as it passes through a cavity comprised of refractory metal tubes or encapsulated foam (typically rhenium). The advantage of this type of rocket is that the temperature of the propellant can be extremely high (theoretically greater than 3,000 K), thus providing high specific impulse thrust. The drawback with this design is that the solar collector(s) must be extremely large (often twenty-five to fifty meters in diameter) to provide the energy needed to heat the propellant from its stored cryogenic state (25 K) to the very high thrust temperature. Concentrator technology has not matured to the point where such concentrators are available for space applications (i.e. light weight and small stowed volume that fit existing space launch vehicles).

The thermal energy storage design solves the concentrator problem by collecting and storing solar energy over an orbital period, and then using the stored energy to provide thrust for a short impulsive burn. A number of burns are required to get the spacecraft to its destination. The longer the storage phase of the mission, the smaller the collector can be. This approach allows the use of existing collector technology to enable the development of a rocket. However, the major drawback to such a system is that the energy storage materials (typically rhenium coated graphite or tungsten encapsulated boron nitride) have temperature limitations well below that of a direct gain system. Current storage designs are limited to about 2400 K to avoid excessive carbon diffusion through the rhenium cladding. Thermal shock, which occurs when the hot thermal storage material/cladding is initially subjected to high velocity cold propellant, can also be a problem in thermal energy storage designs. Another problem is that the temperature of the heated propellant is very high at the start of the pulse but after a short period decreases as heat is extracted by the cold propellant. The resultant performance is less than that theoretically possible using the direct gain design with extremely high propellant outlet temperatures.

The Hybrid Direct Gain/Thermal Energy Storage design adds an all refractory metal section following the thermal energy storage section to allow heating of the propellant above the temperature limit of the thermal energy storage materials. The higher temperatures improve orbit transfer performance.

A problem with both the direct gain and the hybrid designs is that retention of thermal energy becomes much more difficult as the peak cavity temperature increases. Multi-foil insulation is often used to confine heat to the hot zone. At very high temperatures, heat loss out of the cavity aperture and through the multi-foil insulation is dominated by radiation heat transfer, which varies with temperature to the fourth power. Raising the cavity temperature by ten percent results in more than a forty-percent increase in heat loss. Heat input must be significantly increased to compensate for the larger heat losses if very high temperatures are to be obtained. As previously indicated, the size of the space deployable solar concentrators is already a limiting factor in solar thermal rocket systems.

Some solar powered rocket systems incorporate a secondary concentrator between the primary concentrator and the cavity to reduce the size of the aperture, which in turn reduces the amount of heat that can escape by radiation out of the cavity. Losses due to less-than-perfect reflection in the secondary concentrator can be significant. Although it is theoretically possible to limit these losses to less than ten percent, realistic losses are on the order of fifteen to thirty-five percent of the power from the primary concentrator.

In addition to high heat losses, very high temperature designs present material, structural, and manufacturing challenges that are difficult to solve individually and even more difficult to solve in a system, particularly under normal budget constraints. At the desired very high temperatures, refractory materials must be used. Rhenium is the preferred material because of its compatibility with hydrogen and carbon, ductile behavior over the entire temperature range, low vapor pressure, high strength, and high modulus of elasticity. Unfortunately, it is expensive, difficult to form and join, very dense, and has a low heat capacity. The structural behavior of rhenium at very high temperatures is not well characterized and varies significantly with only slight variations in manufacturing processes. To effectively capture and transfer heat to the propellant will require fabrication of leak tight components with relatively large surface areas. Although rhenium-processing technology is advancing, experience with making reliable, leak tight, efficient and lightweight rhenium heat exchangers has proven to be difficult.

As discussed, the above concepts offer enhanced performance, but each has difficult engineering problems particularly when associated with extremely high temperature. A more practical approach is needed.

SUMMARY OF THE INVENTION

The invention addresses the above need. What is provided is a solar thermal rocket that includes a thermal energy storage section, a radiant inter-heater, a primary solar concentrator, and propulsion nozzle. The primary solar concentrator is selectively movable to direct solar energy to either the thermal energy storage section or to the radiant inter-heater. The thermal energy storage section, along with its insulation, is arranged to define a cavity such that a focused beam of solar rays can enter the cavity through an aperture in the insulation. The thermal energy storage section typically absorbs and stores solar energy during the non-propulsion portion of the orbital period. The solar rays are captured and absorbed and thereby heat the thermal energy storage section to very high temperatures. A radiant inter-heater directly receives concentrated solar rays and transfers the heat to the propellant during the propulsion phase. The propellant heated by the inter-heater is directed through the thermal energy storage section where it is further heated to ist peak temperature and then expelled through the nozzle to produce thrust. With the inter-heater, the rate of heat extraction from the thermal energy storage section is reduced, prolonging the period of peak propellant temperature, resulting in an overall higher average specific impulse.

BRIEF DESCRIPTION OF THE DRAWINGS

For a further understanding of the nature and objects of the present invention reference should be made to the following description, taken in conjunction with the accompanying drawings in which like parts are given like reference numerals, and wherein:

FIG. 2 is a longitudinal cross section at the mid-plane of the invention with the primary solar concentrator in the propulsion position for directing solar energy mainly to the radiant inter-heater.

DETAILED DESCRIPTION OF THE PREFERRED EMBODIMENT

Figure 1:
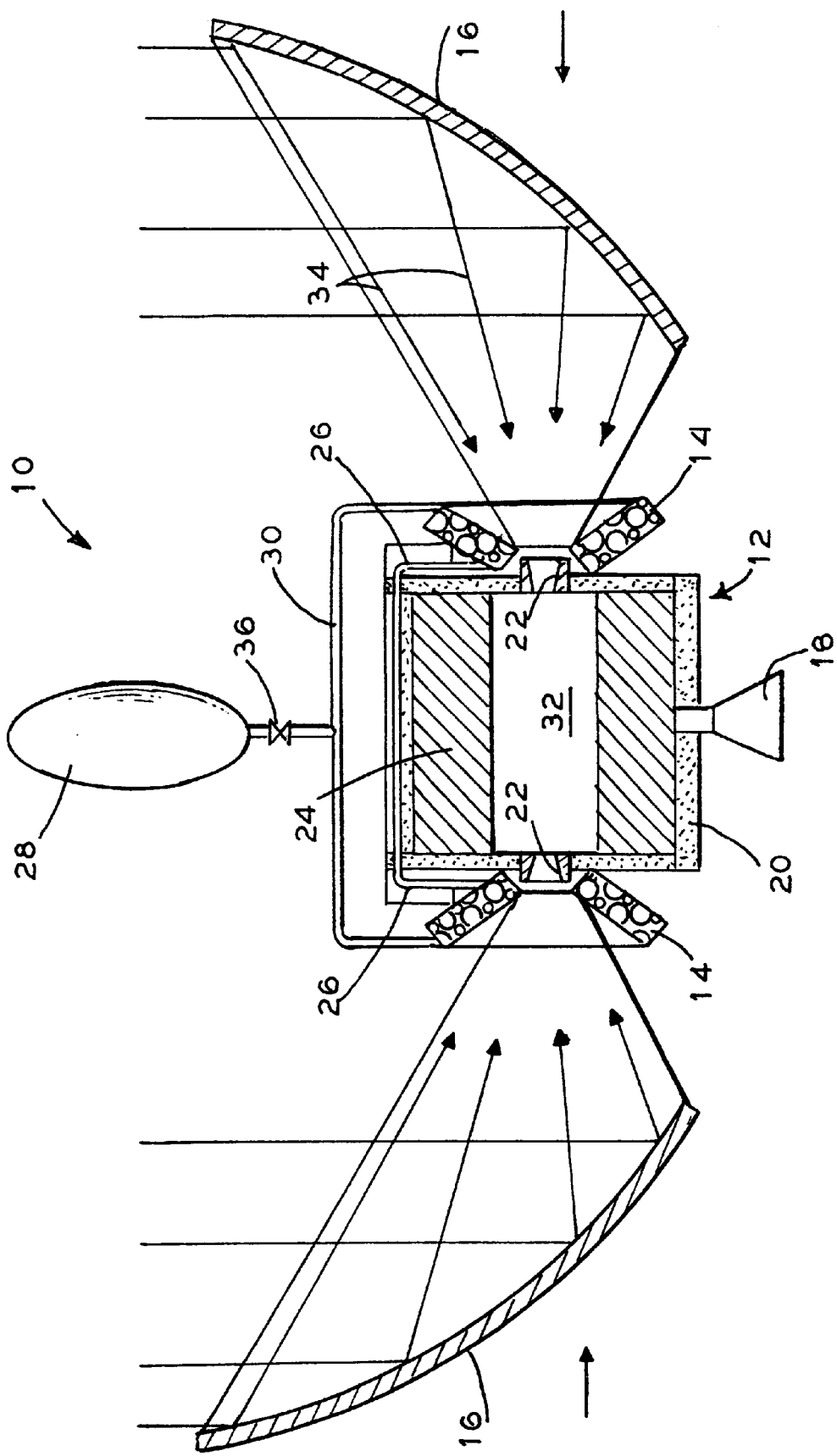
FIG. 1 is a longitudinal cross section at the mid-plane of the invention with the primary solar concentrator in the thermal energy storage section heating position.

Referring to the drawings, it is seen in FIG. 1 that the invention is generally indicated by the numeral 10. Solar thermal rocket 10 is generally comprised of a thermal energy storage section 12, a radiant inter-heater 14, a primary solar concentrator 16, and a propulsion nozzle 18.

Thermal energy storage sections are generally known but will be described for the sake of clarity. Thermal energy storage section 12 contains the thermal energy storage material and flow channels that guide the propellant through the section as it is being heated. The thermal energy storage material is typically graphite coated with rhenium and is configured to form a cavity 32 into which the solar rays 17 are projected. The thermal energy section 12 is enclosed in insulation 20. One or more apertures are provided in the insulation for admitting the solar rays into the cavity 32 where the energy is captured and in the process heats the thermal storage material. A secondary solar concentrator 22 may be provided in each aperture. The secondary solar concentrator 22 serves to reduce the size of the aperture by further focusing the group of solar rays. The smaller aperture minimizes the amount of heat that can radiate out of the cavity 32. The thermal energy storage section 12 is in fluid communication with the radiant inter-heater 14 via piping 26 that is enclosed by insulation 20.

The radiant inter-heater 14 is positioned around or adjacent to the secondary solar concentrator 22 or the cavity 32 aperture if a secondary solar concentrator 22 is not used. The radiant inter-heater 14 is typically comprised of a coil of metal tubing through which the propellant flows. The propellant is heated as it flows through the tubing.

The primary solar concentrator 16 is movable between a first position where it directs the solar rays to the cavity of the thermal energy storage section 12 (FIG. 1) and a second position where it directs the majority of the solar rays to the radiant inter-heater 14 (FIG. 2). Typically, the reflective surface of the concentrator 16 is a segment of a paraboloid, and this surface is positioned such that the focal point is located at or very near the entrance to the secondary concentrator 22.

The propulsion nozzle 18 is in fluid communication with the interior of the thermal energy storage section 12 for receiving and expelling propellant gas to produce thrust.

A propellant supply tank 28 contains a suitable gaseous or liquid propellant such as hydrogen. The tank 28 is in fluid communication with the radiant inter-heater 14 via piping 30 for selectively supplying propellant to the radiant inter-heater during the propulsion phase by means of a valve 36 in piping 30.

Operations are conducted as follows.

FIG. 1 illustrates the non-propulsion phase where the primary solar concentrator 16 is in the first position. In the first position, the primary solar concentrator 16 focuses and directs solar energy to the cavity of the thermal energy storage section 12 through the secondary solar concentrator 22. The lines striking the concentrator represent the solar rays. The arrows represent the reflected solar rays that are directed toward the secondary solar concentrator. The reflected solar rays heat the interior of the thermal energy storage section, which stores the heat for later use during the propulsion phase. Current storage designs are limited to approximately 2400 K.

FIG. 2 illustrates the propulsion phase in which the primary solar concentrator is moved outwardly to its second position where it projects a significant portion of the reflected solar rays onto the radiant inter-heater, with the remainder entering the thermal energy storage section 12 through the secondary concentrator 22. The radiant inter-heater is preferably coated with a high temperature, high absorptivity material (e.g. refractory carbide). This causes it to efficiently absorb and transfer the solar energy to the propellant flowing from the supply tank 28 prior to entering the thermal energy storage section 12. The radiant inter-heater is preferably designed to heat the propellant gas to a temperature of 600 to 800 K and up to 1200 K.

Propellant is released from tank 28 through valve 36 and travels through piping 30 to the radiant inter-heater 14. The propellant travels through and is heated by the radiant inter-heater 14. The heated propellant then travels through piping 26 into the thermal energy storage section 12 where it is further heated. The propellant then travels through the propulsion nozzle 18 to produce thrust for propelling the rocket or satellite as desired.

The invention provides several advantages. It enhances the already high performance of the thermal energy storage design with a practical, high efficiency radiant inter-heater. Very high temperatures are produced in the thermal energy storage section by positioning the primary solar concentrator to project most of the solar energy into the thermal energy storage section during the heat-up phase of the cycle. When the primary solar concentrator is repositioned during the propulsion phase, the radiant inter-heater more efficiently captures the incident solar power and transfers it to the propellant. At the beginning of the propulsion phase, slightly higher peak temperatures in the thermal energy storage section could be obtained by continuing to focus the solar beam into the section. However, by projecting a major portion of the solar energy on the radiant inter-heater, more energy can be captured and used by the apparatus, significantly extending the period during which the propellant can be heated to near peak temperatures.

Another advantage is that the inter-heater operates at less than 1200 K and as such can be made of conventional materials and shapes. With inter-heater temperatures less than 1000 K, austenitic stainless steel is the preferred material. The use of conventional materials reduces fabrication cost and schedule and increases the reliability of the overall apparatus.

Another advantage is the placement of the inter-heater near or around the secondary concentrator. This allows the proportion of the solar power to be adjusted between the inter-heater and the storage section by repositioning the primary solar concentrator.

A further advantage is that the inter-heater reduces the thermal shock on the thermal energy storage section by reducing the temperature difference between the hot storage section and the incoming propellant.

It should be understood that the configuration illustrated and described may be varied. The invention may be comprised of a single primary solar concentrator, secondary solar concentrator, and radiant inter-heater. The thermal energy storage section can be divided into two sections with each having a primary and secondary solar concentrator and inter-heater. The thermal energy storage section could be a monolithic structure with an interior cavity or could be an assembly of several modules arranged to form a cavity to capture the concentrated solar radiation. More than one propulsion nozzle may be used. The radiant inter-heater could be formed from single or multiple tubes, chambers, or other flow confinement arrangements that efficiently absorb the concentrated solar radiation and transfer heat to the flowing propellant. The inter-heater could be constructed of any metal, ceramic, or composite that is compatible with the propellant and interfacing materials over the temperature and pressure range of the operating environment. Whatever material is used, its surface must have a high absorptivity of solar radiation.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A solar thermal rocket, comprising:
   a. an insulated thermal energy storage section;
   b. a radiant inter-heater, said radiant inter-heater being in fluid communication with a first end of said thermal energy storage section;
   c. a propulsion nozzle in fluid communication with a second end of said thermal energy storage section;
   d. a primary solar concentrator, said concentrator being selectively movable between a first position where solar energy is directed to said thermal energy storage section and a second position where solar energy is directed mainly to said radiant inter-heater; and
   e. a propellant storage container, said container being in fluid communication with said radiant inter-heater.

2. The rocket of claim 1, further comprising a secondary solar concentrator provided on said thermal energy storage section.

\* \* \* \* \*